2,838,955

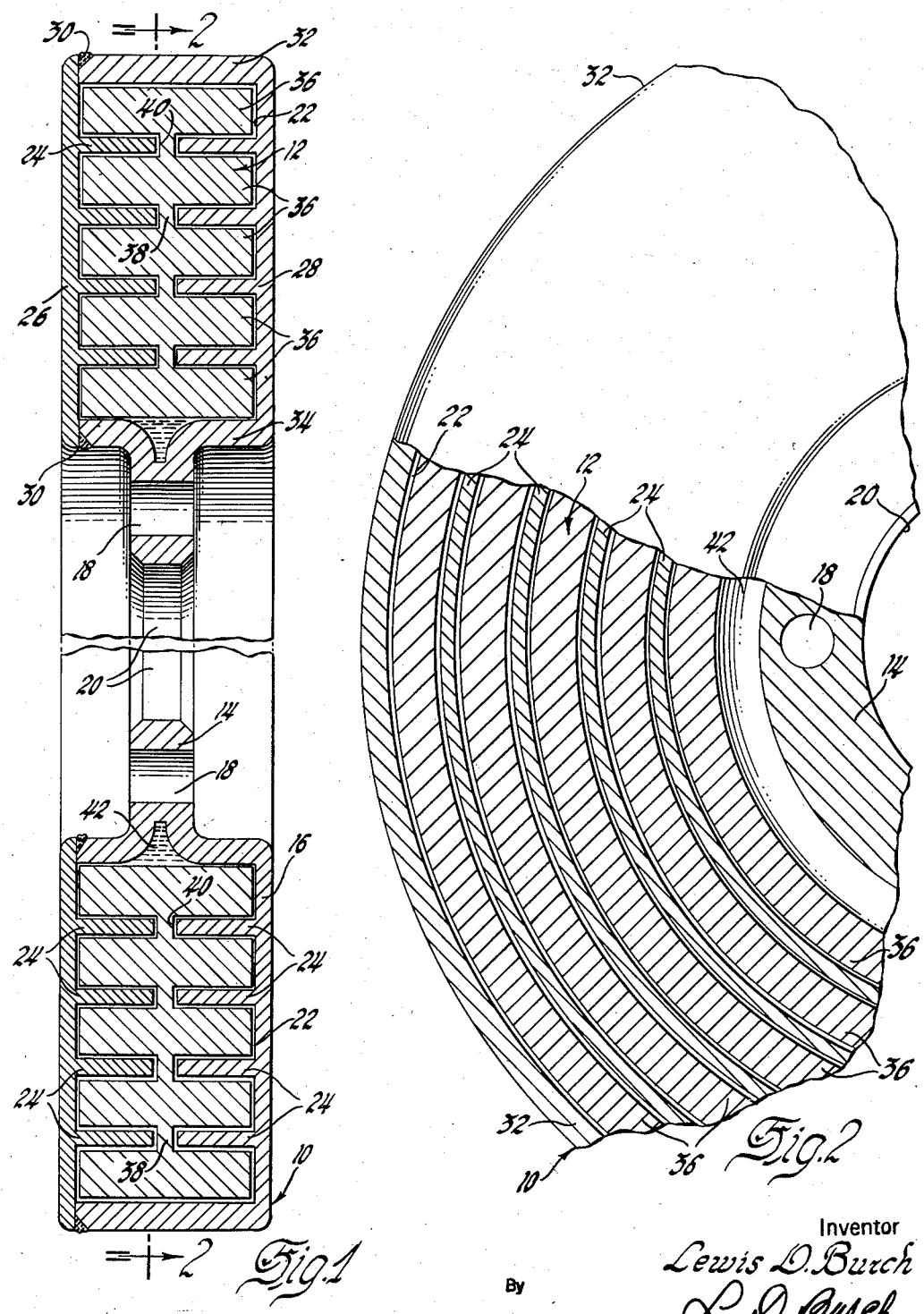

VIBRATION DAMPER

Lewis D. Burch, Dearborn, Mich., assignor to General Motors Corporation, Detroit, Mich., a corporation of Delaware Application April 30, 1954, Serial No. 426,785

11 Claims. (Cl. 74—574)

This invention relates to vibration dampers in general and particularly to torsional vibration dampers for automotive and other uses.

Torsional vibration dampers are commonly employed for damping vibrations and oscillations in rotary shafts such as engine crankshafts and the like. Torsion vibration dampers having frictional facings and generally referred to as frictional vibration dampers have been used with rotary shafts but have not proven satisfactory because of their loss of efficiency due to wear and other failings and in that they require frequent inspection, adjustment and repair. Fluid type torsional vibration dampers have also been employed with rotary members but have been found lacking in their ability to maintain a prescribed efficiency through a wide range of operating temperatures. Changes in the operating temperatures to which fluid type vibration dampers are subjected has been found to have an adverse effect upon the viscosity of the fluid employed in such dampers which reduces their designed damping characteristics.

It is now proposed to provide a damping device for use with crankshafts and other rotary members which has a greater torsional damping efficiency than previous damping devices. Such damping device is highly adaptable for use with rotary shafts having varied operational requirements. The proposed damper is of the viscous fluid type free of gradual decline in efficiency through wear that is experienced in frictional damping devices. The proposed viscous fluid damper makes use of a film of a silicone or other fluid between a movable inertia mass and a housing structure secured for rotation. The thin film of viscous fluid disposed between opposing parallel surfaces of such members is sufficient to cause the flywheel-like inertia mass to rotate with the rotary member and to resist the transmission of torsional oscillatory or vibrational forces.

The proposed viscous fluid damper is provided with increased work surface areas which include a greater peripheral facing area than axial facing area without appreciable change in the size of the damper. The viscous film is accordingly increased considerably over previous dampers of equal size. The disposition of opposed working areas is such as enables a greater heat conductivity from the central part of the inertia mass to the sides and ends of the housing structure where the cooling effect is the greatest. The clearance between opposed peripheral work faces increases proportionately to the increase in radii to provide a constant unit area resistance to relative motion between the inertia mass and the housing member. In order to insure the sufficiency of the fluid film between opposed working faces an annular expansion and surplus fluid supply chamber is provided at the inner periphery of the housing or casing member.

In view of the increase in viscous film area and the high heat conductivity to the end walls of the rotating casing member a silicone fluid and variable clearances are used which will produce a turbulent flow within the viscous fluid during the periods of rotation of the rotary member being damped when torsional, axial, and radial vibrations are the greatest. Turbulent flow through the viscous fluid provides a greater rate of heat exchange between the inertia mass and its casing than would laminar flow.

The foregoing features provide a damper that will operate much cooler than other dampers now in use and due to the increased clearance areas and increased rate of heat exchange the damper will be much more efficient than previously known damping devices.

In the drawing:

Figure 1 is a cross-sectional view of the proposed viscous fluid torsional vibration damper.

Figure 2 is a fragmentary view of the proposed damper taken in the plane of line 2—2 of Figure 1 and viewed in the direction of the arrows thereon. A part of the damper is broken away and shown in cross section.

The viscous fluid damper includes a casing or housing member 10 within which is disposed a flywheel-like inertia mass 12. The housing member 10 is formed to provide a central annular portion 14 supporting an outer annular chamber portion 16. The inner annular portion 14 of the housing member 10 is provided with bolt holes 18 for securing the housing to a rotary shaft such as may be received through opening 20 thereof.

The chamber portion 16 of the housing member 10 includes a plurality of communicating annular chambers 22 which are separated by annular wall members 24 extended inwardly from the side walls 26 and 28 of the housing. The annular wall members 24 are formed from opposite side walls 26 and 28 of the chamber portion 16 concentric about the axis of the housing member 10. The one side wall 26 of the chamber 16 acts as a cover member and is secured as by welding 30 to the end wall 32 and inner wall 34 of the chamber portion.

The flywheel 12 includes a plurality of concentrically arranged annular inertia masses 36 joined by necked down portions 38 to form a one-piece annular member. The flywheel might also be described as an annular mass with a plurality of annular concentric grooves 40 formed on opposite sides thereof. The annular inertia masses 36 are received in spaced relation between the annular walls 24 within the chambers 22. The surfaces of the annular inertia masses 36 are disposed in parallel spaced relation to the annular walls 24 and side walls 26 and 28. The clearance provided between the housing member 10 and flywheel 12 increases with respect to those inertia masses 36 between the inner and outer periphery of the flywheel; the greater clearance being provided about the outermost inertia mass.

An annular chamber 42 is provided in the inner wall 34 of the chamber portion 16 for surplus fluid.

The chambers 22 are filled with a silicone or other viscous fluid, the flywheel 12 disposed within the chamber portion 16 of the housing member 10 and the cover wall 26 is secured in place. With the damper secured to a rotating member, the housing 10 is caused to rotate with the rotary member and the inertia mass or flywheel 12 also to rotate therewith due to the cohesive resistance of the fluid to allow relative motion between the flywheel and the housing member. The reduced clearance between the parallel working surfaces of the flywheel 12 and housing member 10 from the outer to the inner peripheries of the fluid chamber portion 16 of the housing member 10 provides a constant unit area resistance to such relative motion.

Torsional vibrations received by the housing member 10 are dissipated through the film of viscous fluid disposed between the damper housing and flywheel 12. The fluid resistance to the transmission of vibrational forces is converted into thermal energy within the fluid film which is conveyed to the flywheel 12. However, the disposition of the inertia masses 36 of the flywheel member immediate the wall members 24 which are a part of the outside walls 26 and 28, provides a high rate of heat exchange from the flywheel member to the housing member where the heat is dissipated to the atmosphere.

The flywheel 12 includes a greater peripheral surface area than axial surface area due to the manner in which it is formed from a plurality of annular band-like inertia masses 36 centrally joined by the necked down portions 38. Peripheral work surfaces with a viscous fluid film disposed thereover are more effective in resisting relative movement between adjacent members due to the more uniform unit pressures therebetween. The provision of greater peripheral work area therefore greatly increases the effectiveness of the present device. The axial facing is adapted to be as effective by providing for more constant or uniform unit pressures by having the clearance between housing 10 and flywheel 12 varied proportionately to the radial distance of such axial facing from the center of the damper device. Clearance between the housing 10 and flywheel 12 are also varied with respect to peripheral work surfaces in order to provide a more constant overall unit pressure within the damper.

The clearance provided between the housing 10 and flywheel member 12 is sufficient to allow turbulent flow of the viscous fluid and insufficient to reduce the fluid resistance to relative motion to what would be considered a state of fluid drag. Such a turbulent flow is advantageous in conducting away the thermal energy produced in the flywheel 12 in resisting the torsional forces conveyed across the fluid film from the housing member 10. The thermal energy is conveyed by the turbulent fluid flow to the immediate wall members 36 and side walls 26 and 28 which walls are continually cooled through rotation. The turbulent flow is also conducive to the dissipation of thermal energy to the outermost periphery of the housing 10 where the end wall 32 is the coolest.

The chamber 42 maintains a surplus liquid supply which fluid, by centrifugal force, is available for forming the viscous fluid film. The chamber 42 also enables expansion of the fluid disposed in the chamber portion 16 of the housing member.

I claim:

1. A vibration damper including a rotary housing member having an annular chamber formed therein, a free floating flywheel member disposed within said chamber in spaced relation to the side walls thereof, said flywheel being spaced relative to said housing to provide a clearance therebetween varied at a uniform rate between the inner and outer peripheries of said chamber, and viscous fluid means forming a fluid film within said clearance having constant resistance to relative motion between said flywheel and housing members and being adapted to dissipate vibrational forces passing therebetween.

2. A vibration damper including a rotary housing member having an annular chamber formed therein, a free floating flywheel member disposed within said chamber in spaced relation to the side walls thereof, said flywheel being spaced relative to said housing to provide a clearance therebetween, and viscous fluid means forming a fluid film within said clearance having a resistance to relative motion between said flywheel and housing members and being adapted to dissipate vibrational forces passing therebetween, said clearance being varied at a uniform rate between the inner and outer peripheries of said chamber to provide a constant unit resistance within said fluid film and throughout said damper to relative motion between said members.

3. A vibration damper including a rotary housing member having an annular chamber formed therein, a plurality of concentric annular walls formed from opposite sides of said housing and extended within said chamber, a flywheel member disposed within said chamber in spaced relation to the side walls thereof and including a plurality of concentric annular grooves receiving said annular walls therein, said flywheel being spaced relative to said housing to provide varied radial clearance therebetween, and viscous fluid means filling said chamber and forming a fluid film between said flywheel and housing members having a constant unit resistance to relative motion between said members and being adapted to dissipate vibrational forces passing therebetween.

4. A torsional vibration damper including a housing member having an annular fluid chamber formed therein, annularly disposed and inwardly extending concentric dividing walls formed from opposite sides of said housing within said chamber, an annular inertia mass disposed within said chamber, annular grooves formed within opposite faces of said inertia mass and adapted to receive said dividing walls in spaced relation therewithin, said chamber being filled with a viscous fluid forming a fluid film between said housing and said inertia mass for resisting relative movement between said mass and said housing and for absorbing vibrational forces passing therebetween.

5. A torsional vibration damper including a housing member having an annular fluid chamber formed therein, an annular inertia mass disposed within said chamber, concentric annular dividing walls formed from opposite sides of said housing and extending transversely within said chamber, said inertia mass including a plurality of concentric annular grooves receiving said dividing walls in spaced relation therewithin, said chamber being filled with viscous fluid for forming a viscous fluid film between said inertia mass and the sides of said housing, said fluid film providing uniform resistance to relative motion between said inertia mass and said housing and being adapted to dissipate vibrational forces passing therebetween during rotation of said housing.

6. A vibration damper including a housing member having an annular fluid chamber formed therein, said chamber including a plurality of concentric annular walls extending transversely from opposite sides of said housing within said chamber, a flywheel member disposed within said chamber and having a plurality of concentric annular grooves formed in opposite sides thereof, said grooves receiving said walls in parallel spaced relation to the sides of said flywheel member forming said groove, said flywheel having a greater peripheral surface than axial surface, and viscous fluid means disposed within said chamber and forming a viscous fluid film between the adjacent surfaces of said flywheel and housing members, said fluid film resisting relative movement between said flywheel and said housing members and dissipating vibrational forces passing therebetween.

7. A torsional vibration damper including an annular housing member having a central portion adapted to be secured to a rotary member and an outer annular portion formed to provide a fluid chamber, a plurality of concentrically arranged annular dividing walls formed from opposite sides of said housing and extended within said chamber, a free floating flywheel member disposed within said chamber, said flywheel member having a plurality of concentric annular grooves formed in opposite sides thereof, said grooves being adapted to receive said dividing walls in spaced relation therein, and viscous fluid means disposed within said chamber for forming a fluid film between said flywheel member and said housing member, said film providing a constant resistance to relative motion between said flywheel and said housing member and being adapted to dissipate vibrational forces received by said housing member.

8. A vibration damper including a housing member having a closed annular fluid chamber formed therein, annular concentric walls formed from the opposite sides of said housing and extended transversely within said chamber, a flywheel member disposed within said chamber and including a plurality of annular concentric grooves formed in opposite faces thereof, said grooves receiving said walls therein and in parallel spaced relation to the sides of said flywheel member forming said grooves, the clearance between adjacent parallel surfaces of said flywheel and housing members being increased proportionately to the radii of said housing member, and viscous fluid means disposed within said chamber for forming a viscous fluid film between said flywheel and housing members, said film providing a constant resistance to relative motion between said flywheel and housing members and being adapted to dissipate vibrational forces passing therebetween.

9. A vibration damper including an annular housing member adapted to be secured to a rotary member, said housing being formed to provide an annular fluid chamber and including a plurality of concentric annular walls formed from opposite sides of said housing and extended within said chamber, a free floating flywheel member disposed within said chamber having a plurality of concentric annular grooves formed in opposite sides thereof, said grooves receiving said walls therein in spaced relation to the axially extending sides of said flywheel forming said groove, said axially extending sides providing a plurality of peripheral work surfaces, viscous fluid means disposed within said chamber and forming a viscous fluid film between said flywheel and housing members, said viscous fluid film providing resistance to relative motion between said flywheel and said housing and being adapted to absorb vibrational forces passing therebetween.

10. A vibration damper including a rotary housing member having an annular fluid chamber formed therein, an annular flywheel member disposed within said chamber, said flywheel being spaced relative to said housing to provide a uniformly increasing radial clearance between the inner and outer peripheries of said chamber, an annular fluid reserve chamber formed within said housing and communicating with said chamber at the inner periphery thereof, and viscous fluid means filling said chambers and forming a viscous fluid film between said housing and flywheel members, said reserve chamber providing reserve fluid sufficient to maintain said fluid film during rotation of said housing, said film providing a uniform and constant resistance to relative motion between said members and absorbing vibrational forces passing therebetween.

11. A torsional vibration damper including a housing member having an annular fluid chamber formed therein, a flywheel member disposed within said chamber in spaced relation to the sides of said housing forming said chamber, concentric annular grooves formed in one of said members for receiving concentric annular walls formed from the other of said members, and viscous fluid means filling said chamber and forming a viscous fluid film between said flywheel and housing members, said walls being spaced apart from the sides of said grooves proportionately to their radii for providing a constant unit resistance within said fluid film to relative motion between said members, said fluid film resisting the transmission of vibrational forces thereacross and providing turbulent flow for the dissipation of thermal energy away from said flywheel member.

References Cited in the file of this patent
UNITED STATES PATENTS

| | | |
|---|---|---|
| 1,085,443 | Lanchester | Jan. 27, 1914 |
| 1,346,755 | Lanchester | July 13, 1920 |
| 2,220,524 | Kapitza | Nov. 5, 1940 |
| 2,514,136 | O'Connor | July 4, 1950 |